(12) United States Patent
Schwartz et al.

(10) Patent No.: US 9,739,316 B2
(45) Date of Patent: Aug. 22, 2017

(54) TORQUE TUBE ASSEMBLIES FOR USE WITH AIRCRAFT HIGH LIFT DEVICES

(71) Applicant: The Boeing Company, Chicago, IL (US)

(72) Inventors: Douglas John Schwartz, Kirkland, WA (US); Mark Robert Meyer, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 10 days.

(21) Appl. No.: 14/817,643

(22) Filed: Aug. 4, 2015

(65) Prior Publication Data
US 2017/0037910 A1    Feb. 9, 2017

(51) Int. Cl.
*F16D 3/32*     (2006.01)
*B64C 9/00*     (2006.01)
(Continued)

(52) U.S. Cl.
CPC .................. *F16D 3/32* (2013.01); *B64C 9/00* (2013.01); *B64C 13/28* (2013.01); *F16C 3/035* (2013.01); *F16D 1/072* (2013.01); *F16D 1/10* (2013.01); *F16D 1/108* (2013.01); *F16D 3/06* (2013.01); *F16D 3/387* (2013.01); *F16C 2326/43* (2013.01); *F16D 2001/103* (2013.01)

(58) Field of Classification Search
CPC ... B64C 13/28; B64C 9/00; F16D 3/32; F16D 1/10; F16D 3/06; F16D 3/03; F16D 1/072; F16D 1/108; F16D 3/387; F16D 2001/103; F16C 3/305; F16C 2326/43
See application file for complete search history.

(56) References Cited

U.S. PATENT DOCUMENTS 3,293,884 A * 12/1966 Grob .......................... F16C 3/02
                                                                                     464/162
3,642,311 A     2/1972 Edgemond, Jr.
(Continued)

FOREIGN PATENT DOCUMENTS

EP           2829759 A1 * 1/2015             F16D 3/16

OTHER PUBLICATIONS

Chrysler, "800ae12b," retrieved from [URL: https://w05.dealerconnect.chrysler.com/service/mds2002/serviceInfo/en_US/800ae12b.gif] on Aug. 4, 2015, 1 page.
(Continued)

*Primary Examiner* — Assres H Woldemaryam
(74) *Attorney, Agent, or Firm* — Hanley, Flight & Zimmerman, LLC (57) ABSTRACT

Example torque tube assemblies for use with aircraft high lift devices are described herein. An example apparatus includes a spline coupling having a first yoke, a sliding splined shaft having a second yoke and a torque tube having a first end and a second end opposite the first end. A first fitting with a third yoke is coupled to the first end of the torque tube, and a second fitting with a fourth yoke is coupled to the second end of the torque tube. The third yoke is coupled to the first yoke to form a first U-joint, and the fourth yoke is coupled to the second yoke to form a second U-joint. The spline coupling is to be coupled to a first high lift device drive shaft and the sliding splined shaft is to be coupled to a second high lift device drive shaft.

8 Claims, 9 Drawing Sheets

(51) Int. Cl.
*F16D 1/072* (2006.01)
*F16D 1/108* (2006.01)
*F16D 3/06* (2006.01)
*F16D 3/38* (2006.01)
*F16C 3/035* (2006.01)
*B64C 13/28* (2006.01)
*F16D 1/10* (2006.01)

(56) References Cited

U.S. PATENT DOCUMENTS

| | | | | |
|---|---|---|---|---|
| 4,561,799 | A * | 12/1985 | Arena | B21D 26/14 285/382.2 |
| 4,930,204 | A | 6/1990 | Schurter | |
| 5,686,907 | A | 11/1997 | Bedell et al. | |
| 5,983,478 | A * | 11/1999 | Dolan | B21D 26/14 29/419.2 |
| 6,164,698 | A | 12/2000 | Gotoh | |
| 6,475,093 | B1 | 11/2002 | Keyes et al. | |
| 9,316,264 | B2 * | 4/2016 | Choi | F16D 3/06 |
| 2004/0226170 | A1 * | 11/2004 | Prucher | F16D 1/06 29/893 |
| 2006/0144903 | A1 | 7/2006 | Perry et al. | |
| 2008/0125231 | A1 * | 5/2008 | Fujita | B62D 1/185 464/169 |
| 2010/0120545 | A1 * | 5/2010 | Huis | F16D 1/10 464/134 |
| 2010/0130291 | A1 * | 5/2010 | Ando | B60K 17/22 464/162 |
| 2011/0030496 | A1 * | 2/2011 | Tokioka | F16C 3/035 74/492 |
| 2012/0080258 | A1 * | 4/2012 | Tokioka | B62D 1/20 180/444 |
| 2012/0108349 | A1 * | 5/2012 | Foley | F16D 3/06 464/162 |
| 2014/0113734 | A1 * | 4/2014 | Lee | F16D 3/32 464/118 |
| 2014/0187339 | A1 * | 7/2014 | Kurokawa | B62D 1/16 464/162 |
| 2015/0075897 | A1 * | 3/2015 | Copeland | B60K 17/22 180/383 |
| 2015/0083852 | A1 | 3/2015 | Moser et al. | |
| 2015/0119154 | A1 * | 4/2015 | Choi | F16D 3/06 464/180 |

OTHER PUBLICATIONS

Fraunhofer Institute for Machine Tools and Forming Technology IWU, "Electromagnetic Forming," retrieved from [URL: http://www.iwu.fraunhofer.de/content/dam/iwu/en/documents/Brochures/IWU-KB-Electromagnetic-Forming.pdf], 2013, 8 pages.

Summitracing.com, "Fastshafts Yokes AE128," retrieved from [URL: http://www.summitracing.com/parts/axe-ae128] on Aug. 4, 2015, 3 pages.

European Patent Office, "Extended European search report," issued in connection with European Patent Application No. 16168410.5, dated Dec. 16, 2016, 9 pages.

* cited by examiner

TORQUE TUBE ASSEMBLIES FOR USE WITH AIRCRAFT HIGH LIFT DEVICES

FIELD OF THE DISCLOSURE

This disclosure relates generally to torque tube assemblies and, more particularly, to torque tube assemblies for use with aircraft high lift devices.

BACKGROUND

Aircraft employ high lift devices, sometimes referred to as auxiliary airfoils, along the leading and trailing edges of the wings. For example, high lift devices along the leading edge of a wing are referred to as slats and high lift devices along the trailing edge of a wing are referred to as flaps. The high lift devices are actuated to extend outward from the wing to change the aerodynamic lift of the wing during takeoff and landing. Each of the high lift devices is actuated by one or more drive mechanisms, which are coupled to ribs or support beams in the wing. In particular, each drive mechanism includes a pinion gear that is rotated to drive a rack coupled to the high lift device. As the pinion gear is rotated, the rack is driven to move the high lift device along a track, thereby extending the high lift device outward from the wing. Each pinion gear is in driving engagement with a geared rotary actuator (GRA). Each pinion gear and its respective GRA is interconnected with an adjacent (e.g., upstream and downstream) pinion gear and GRA via a torque tube. In other words, an aircraft typically employs a series of torque tubes that translate torque to each of the driving mechanisms along the leading or trailing edge of the wing. One motor may be used to drive one of the driving mechanisms, which thereby transfers torque to each of the other driving mechanisms through the series of torque tubes. Therefore, each of the high lift devices may be controlled to move, simultaneously with the other high lift devices, between a stowed configuration and an extended configuration.

Known torque tube assemblies utilize bolted flanges to couple a torque tube to a pinion gear or GRA. However, using flanges results in a relatively large rotational envelope, which requires a relatively large space to accommodate the rotating flanges. Additionally, the use of flanges can be hazardous if a technician's hands are close to the torque tube during operation. Further, in some instances, the bolts of the flange can loosen, thereby compromising the structural integrity of the torque tube. Also, as the wing flexes (e.g., due to change in weight of the wing from decreasing fuel), the alignment and distances between the driving mechanisms may change. This flexing of the wing causes additional forces and strain on the torque tube assemblies.

SUMMARY

An example apparatus disclosed herein includes a spline coupling having a first yoke. The spline coupling is to be coupled to a first high lift device drive shaft of an aircraft. The example apparatus also includes a sliding splined shaft having a second yoke. The sliding splined shaft is to be coupled to a second high lift device drive shaft of the aircraft. The example apparatus further includes a torque tube having a first end and a second end opposite the first end. A first fitting with a third yoke is coupled to the first end of the torque tube, and a second fitting with a fourth yoke is coupled to the second end of the torque tube. In the example apparatus, the third yoke of the first fitting is coupled to the first yoke of the spline coupling to form a first U-joint, and the fourth yoke of the second fitting coupled to the second yoke of the sliding splined shaft to form a second U-joint.

An example method disclosed herein includes coupling a first fitting having a first yoke to a first end of a torque tube and coupling a second fitting having a second yoke to a second end of the torque tube. The example method also includes coupling the first yoke to a third yoke of a spline coupling to form a first U-joint and coupling the second yoke to a fourth yoke of a sliding splined shaft to form a second U-joint. The example method further includes coupling the spline coupling to a driving member associated with a first high lift device on an aircraft wing and coupling the sliding splined shaft to a driven member associated with a second high lift device on the aircraft.

Another example apparatus disclosed herein includes a first geared rotary actuator coupled to an aircraft wing. The first geared rotary actuator has a first drive shaft. The example apparatus includes a second geared rotary actuator coupled to the aircraft wing. The second geared rotary actuator has a second drive shaft. The example apparatus also includes a torque tube coupled between the first drive shaft and the second drive shaft. A first end of the torque tube is coupled to the first drive shaft via a first U-joint, and the first U-joint is formed between a spline coupling and a first end fitting coupled to the first end of the torque tube.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example torque tube assemblies and related methods that may be employed to mechanically transmit torque from a driver, such as an output shaft of a motor or actuator of a high lift device, to a driven device, such as an input shaft of a subsequent (e.g., downstream, outboard) actuator a high lift device. An example torque tube assembly disclosed herein includes a first universal joint (U-joint) formed between a first torque tube fitting on one end of the torque tube and a spline coupling. The spline coupling includes an integral yoke that couples with a yoke on the first torque tube fitting to form the first U-joint. The yoke of the first torque tube fitting is integral with the first torque tube fitting and, thus, fixedly attached to the end of the torque tube. The spline coupling includes an opening with splines (e.g., ribs) to receive a spline gear of a driving member (e.g., a first drive shaft). The driving member may be a pinion shaft and/or an output shaft of a geared rotary actuator (GRA).

The example torque tube assembly also includes a second U-joint formed between a second torque tube fitting on the opposite end of the torque tube and a sliding splined shaft. The sliding splined shaft includes an integral yoke that couples with a yoke on the second torque tube fitting to form the second U-joint. The yoke of the second torque tube fitting is integral with the second torque tube fitting and, thus, fixedly attached to the other end of the torque tube. The sliding splined shaft has a sleeve with a splined opening for receiving another drive shaft (e.g., a second drive shaft), such as a splined pinion shaft. Therefore, one end of the torque tube assembly includes the spline coupling, which may be coupled to a first drive shaft of a first GRA via the spline gear (e.g., an upstream driving member), and the other end of the torque tube assembly includes the sliding splined shaft, which may slidably receive a second drive shaft of a second GRA (e.g., a downstream driven member). As the spline gear of the first GRA rotates, the rotational power is transferred from the upstream drive shaft of the first GRA to the downstream driven shaft of the second GRA.

In some examples, the spline gear is fixedly coupled to the spline coupling while the sliding splined shaft is slidably engaged with the downstream pinion shaft (e.g., the second drive shaft). Therefore, the sliding splined shaft can translate axially along the downstream drive shaft. Thus, as the wing flexes, the torque tube assembly can be displaced axially to reduce strain and force on the torque tube assembly. Also, as the wing flexes, the U-joints enable the torque tube assembly to move angularly with respect to the driving member (e.g., the first drive shaft and/or the spline gear) or the driven member (e.g., the downstream drive shaft of the second GRA).

Additionally, because the example torque tube assemblies do not employ flanges (e.g., because they implement smaller envelope fittings such as EMF formed fittings), the rotational envelope is relatively smaller than known torque tube assemblies. Also, the risk of loosening flange bolts is significantly reduced. Further, the example torque tube assemblies described herein are less susceptible to dynamical imbalance, which may be caused by a missing bolt, for example. The example torque tube assemblies described herein also utilize fewer fasteners than known torque tube assemblies.

Figure 1:
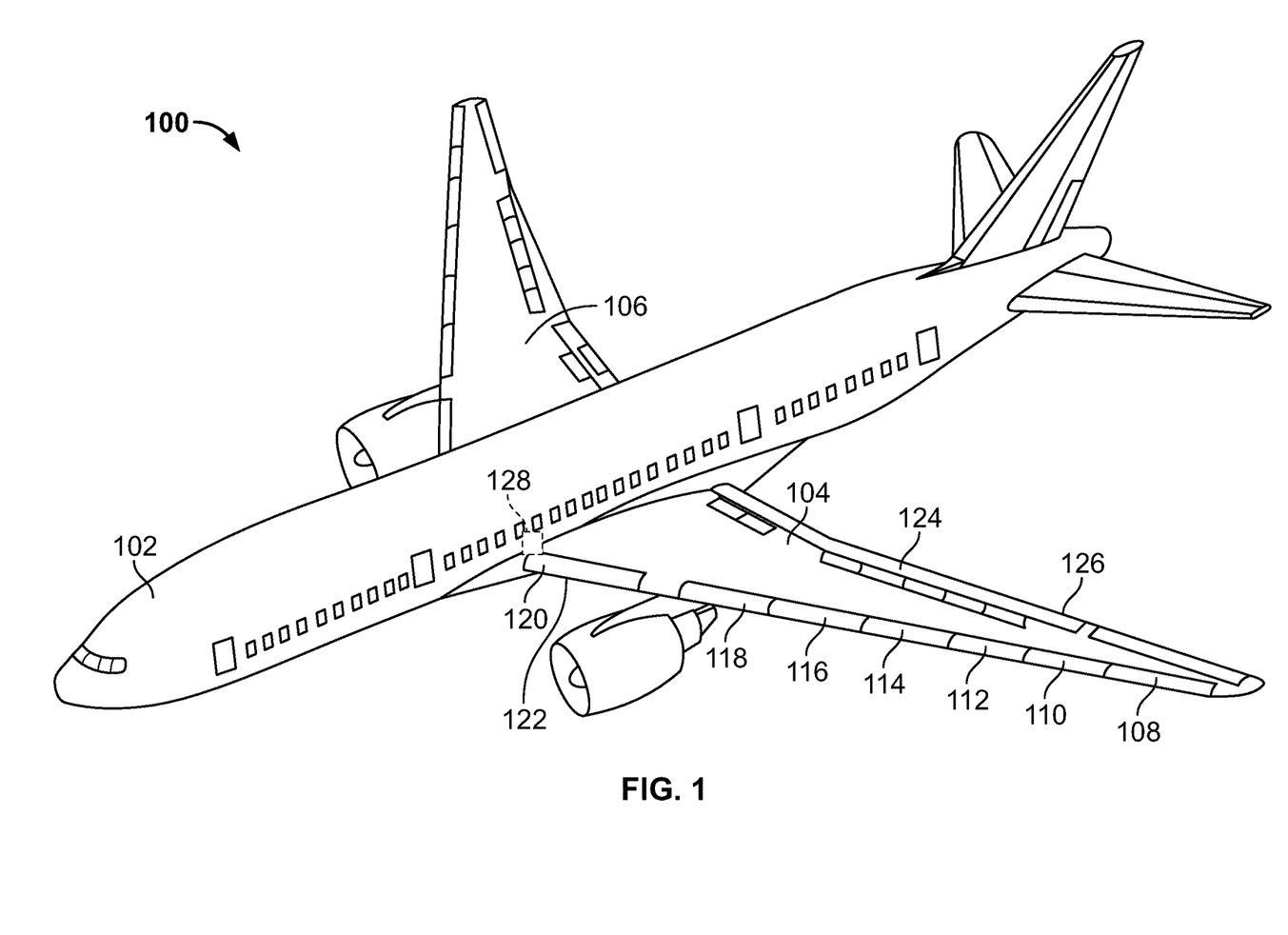
FIG. 1 illustrates an example aircraft in which the example torque tube assemblies and related methods disclosed herein may be implemented.

FIG. 1 illustrates an example aircraft 100 in which the examples disclosed herein may be implemented. In the illustrated example, the aircraft 100 includes a fuselage 102, a first wing 104 coupled to the fuselage 102 and a second wing 106 that are coupled to the fuselage 102. The first and second wings 104, 106 of the illustrated example have control surfaces such as high lift devices (e.g., auxiliary airfoils, slats, Kreuger flaps, trailing edge slats, etc.) that are located long the leading and trailing edges of the first and second wings 104, 106, and which may be displaced or extended to change the aerodynamic lift of the aircraft 100 during takeoff or landing. When extended from the first wing 104, the high lift devices increase the effective size, curvature camber and area of the first wing 104, thereby increasing the lift of the first wing 104. For example, the first wing 104 includes a first slat 108, a second slat 110, a third slat 112, a fourth slat 114, a fifth slat 116, a sixth slat 118 and a seventh slat 120 located along a leading edge 122 and a flap 124 located along a trailing edge 126. The first wing 104 may include more or fewer slats and flaps. Additionally or alternatively, the first wing 104 may include other control surfaces such as ailerons, spoilers, tabs, trailing edge slats, Kreuger flaps, etc. The second wing 106 may include similar high lift devices but are not discussed to avoid redundancy.

In general, each of the slats 108-120 is deployed using two separate but coordinated drive mechanisms or actuators, one on the inboard side and one on the outboard side of the respective slat 108-120. The respective actuators of the slats 108-120 are coupled to each other to and an adjacent (e.g., an upstream or downstream) drive mechanism via example torque tube assemblies, as disclosed in further detail herein. In the illustrated example, a motor or power drive unit (PDU) 128 is employed to drive an actuator for deploying the seventh slat 120. An output of the actuator is operatively coupled via an example torque tube assembly to another actuator for deploying the seventh slat 120, which is operatively coupled via an example torque tube assembly to drive another actuator for deploying the sixth slat 118, and so forth. Therefore, the PDU 128 provides driving power to all of the actuators via the torque tube assemblies along the leading edge 122 of the first wing 104 to deploy the high lift devices. In some examples, the PDU 128 also provides driving power to all of the actuators for driving the slats on the second wing 106. As a result, all of the slats along the leading edges of the first and second wings 104, 106 may be deployed simultaneously. Although the torque tube assemblies are described in relation to the slats 108-120, it is understood that the examples disclosed herein may be similarly applied to any of the other high lift devices (e.g., the trailing edge flaps).

Figure 2:
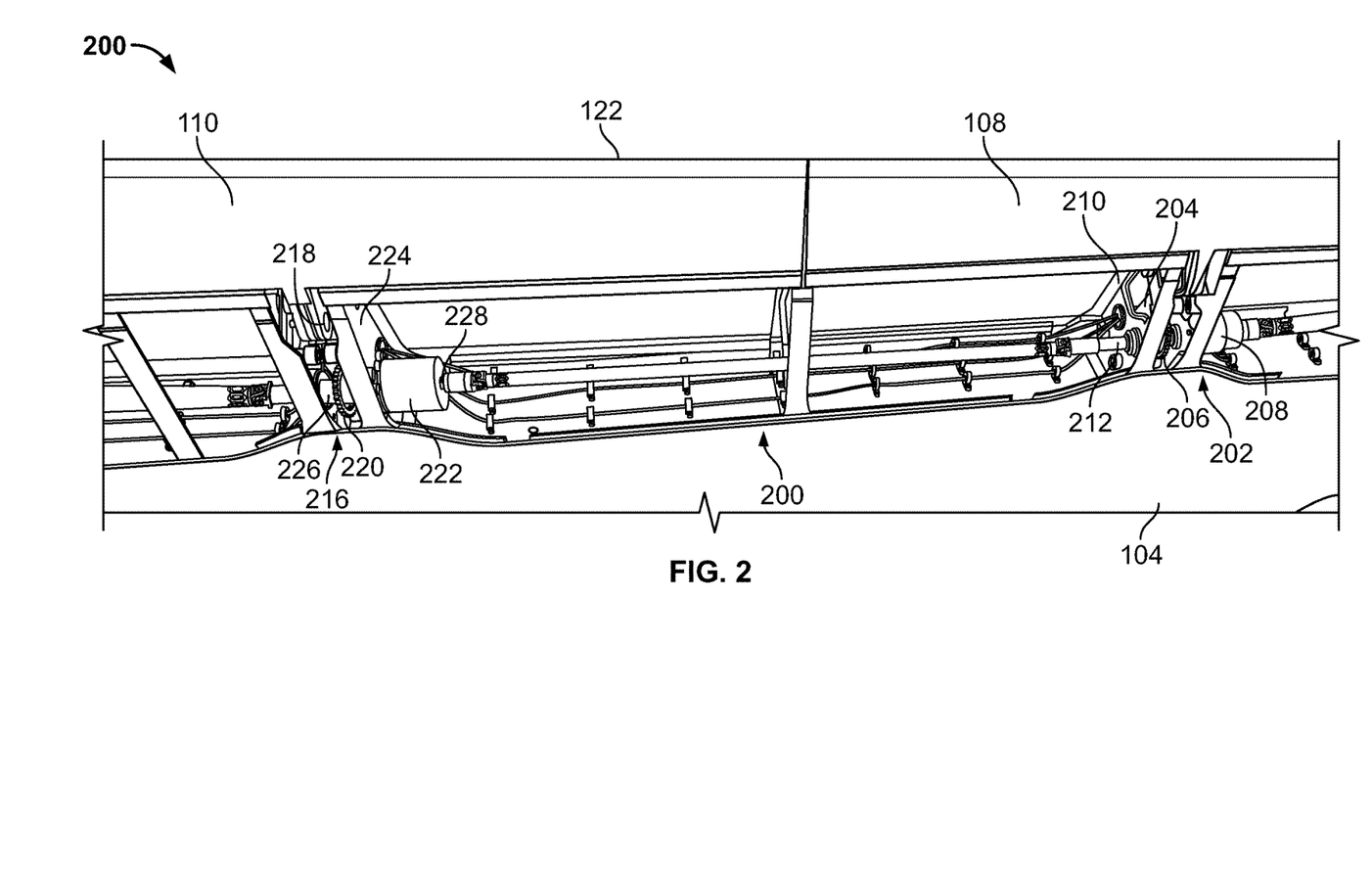
FIG. 2 is a partially sectioned view of an underside of a wing of the aircraft in FIG. 1 showing an example torque tube assembly constructed in accordance with the teachings of this disclosure.

FIG. 2 shows an underside of the leading edge 122 of the first wing 104 between the first slat 108 and the second slat 110. As disclosed above, each of the slats 108-120 is actuated by two actuators (e.g., rack and pinion assemblies) that are mounted to ribs or supports in the first wing 104, and the actuators are driven by the PDU 128 (FIG. 1). An example torque tube assembly 200 is illustrated that is employed to transfer rotational energy between one of the actuators of the second slat 110 and one of actuators of the first slat 108. In particular, a first actuator 202 is provided for moving the first slat 108. The first actuator 202 includes a first rack 204 (e.g., a geared rack, a toothed rack), a first pinion gear 206 (e.g., a circular gear) that drives the first rack 204, and a first geared rotary actuator (GRA) 208 that drives the first pinion gear 206. The first pinion gear 206 is rotatably coupled (e.g., mounted) to a first rib or support 210 of the first wing 104. As the first pinion gear 206 rotates, the first rack 204 is driven outward, thereby extending the first slat 108 outward from the first wing 104. In some examples, the first pinion gear 206 drives a sector gear, which drives the first rack 204. The first pinion gear 206 is coupled to and driven by the first GRA 208. The first GRA 208 has an upstream or input shaft 212 and a downstream or output shaft 214 (shown in FIG. 3) (e.g., a high lift device drive shaft). The first GRA 208 contains a gear train (e.g., a system of gears, a transmission) that may be used to change the gearing ratio between an input (e.g., the input shaft 212) and the first pinion gear 206. In general, the PDU 128 (FIG. 1) spins at a relatively fast speed (e.g., about 700 revolutions per minute (RPM)). The first GRA 208 reduces the rotational speed provided to the first pinion gear 206 and, thus, increases the torque provided to the first pinion gear 206. Similar to first slat 108, the second slat 110 includes a second actuator 216 having a second rack 218 and a second pinion gear 220 driven by a second GRA 222 and operatively coupled to a second rib or support 224. The second GRA 222 has an upstream or input shaft 226 and a downstream or output shaft 228 (e.g., a high lift device drive shaft). To transfer rotational energy from the output shaft 228 of the second GRA 222 to the input shaft 212 of the first GRA 208, the example torque tube assembly 200 is employed. Therefore, as the output shaft 228 of the second GRA 222 rotates, the rotational power is transferred to the input shaft 212 of the first GRA 208. A similar torque tube assembly may be employed between each of the actuators (e.g., rack and pinion assemblies) of each of the slats 108-120. The seventh slat 120 (FIG. 1), which is the most inboard slat, includes an actuator (e.g., a pinion gear and GRA) that is driven by the PDU 128 (FIG. 1). An output of the actuator is operatively coupled to another actuator of the seventh slat 120 or to an actuator of the sixth slat 118 via a torque tube assembly, and so forth. Therefore, the input shaft 226 of the second GRA (and, thus, the second pinion gear 220) is rotated via an upstream torque tube assembly operatively coupled to an inboard actuator of the second slat 110 or from actuator of the third slat 112 (e.g., depending on how many actuators are used for each of the slats 108-120). Similarly, the output shaft 214 of the first GRA 208 may be operatively coupled to another actuator of the first slat 108 via an example torque tube assembly.

Figure 3:
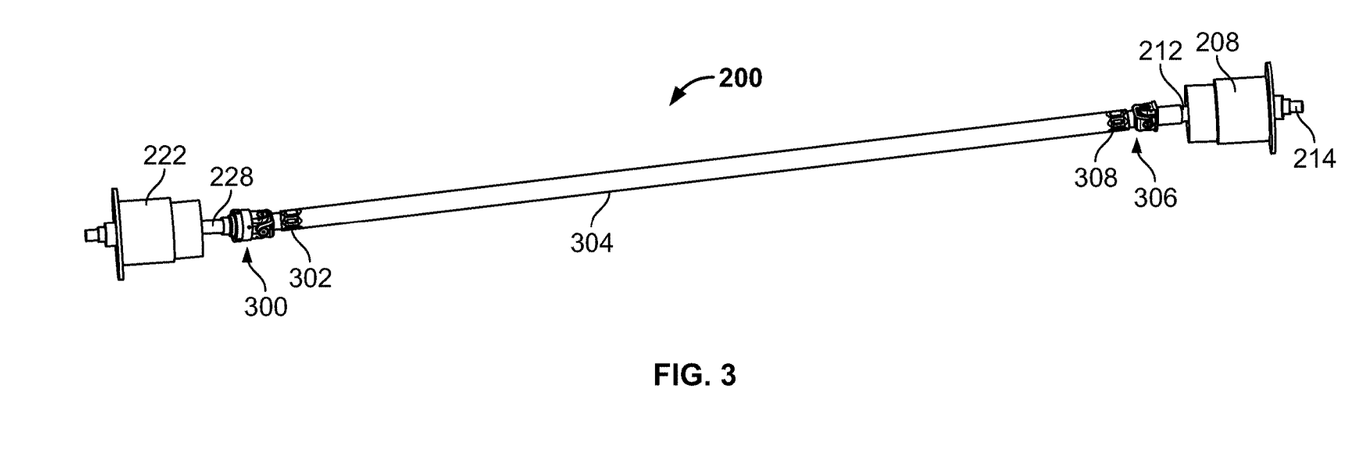
FIG. 3 is a perspective view of the example torque tube assembly of FIG. 2 having a first example joint and a second example joint.

FIG. 3 shows an isolated view of the example torque tube assembly 200 coupled between the output shaft 228 of the second GRA 222 and the input shaft 212 of the first GRA 208. In the illustrated example, the torque tube assembly 200 includes a first joint 300 between the output shaft 228 of the second GRA 222 and a first end 302 of a torque tube 304. The torque tube assembly also includes a second joint 306 between a second end 308 of the torque tube 304 and the input shaft 212 of the first GRA 208. The torque tube 304 may be any length as desired.

Figure 4:
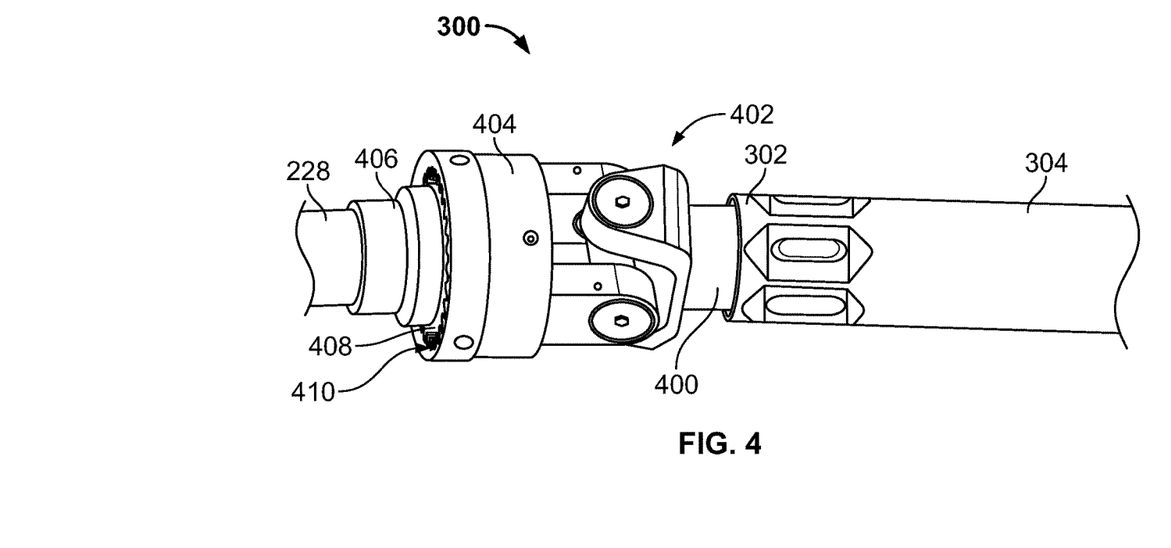
FIG. 4 is an enlarged perspective view of the first example joint of FIG. 3 employing an example spline coupling to receive an example spline gear.
Figure 5:
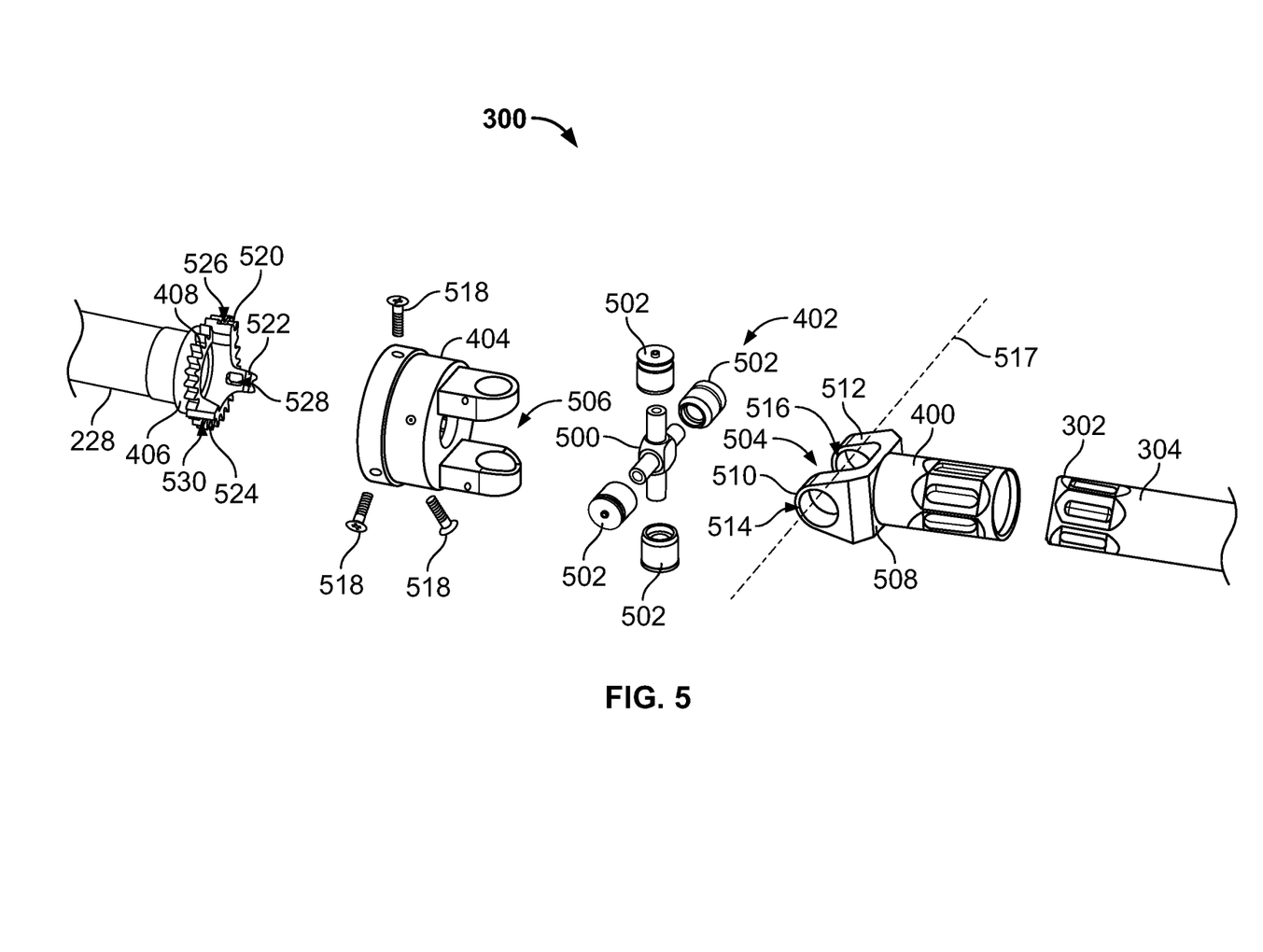
FIG. 5 is an exploded view of the first example joint of FIG. 4.

FIG. 4 shows an enlarged view of the first joint 300 and FIG. 5 shows an exploded view of the first joint 300. As shown in the illustrated example, the first end 302 of the torque tube 304 is coupled to a first torque tube fitting 400 (e.g., an end fitting). In the illustrated example, the first torque tube fitting 400 is fixedly coupled to the first end 302 of the torque tube 304 by an electromagnetic fitting or forming (EMF) process. An example EMF process for coupling an end fitting to an end of a torque tube is described in U.S. Pat. No. 5,983,478, which is incorporated herein by reference in its entirety. EMF produces excellent rigid mechanical, torque transmitting couplings between an end of a torque tube and an end fitting.

The first torque tube fitting 400 forms a first U-joint 402 with a spline coupling 404. As shown more clearly in FIG. 5, the first U-joint 402 includes a cross-journal 500 (e.g., a spider) and four bearing caps 502 (which include an array of needle bearings) that are coupled between a first yoke 504 (e.g., a fork) on the first torque tube fitting 400 and a second yoke 506 on the spline coupling 404. The first torque tube fitting 400 has a wall or plate 508 and a first ear 510 and a second ear 512 that extend from the plate 508 to form the first yoke 504. The first and second ears 510, 512 have respective first and second openings 514, 516 that are coaxially aligned along an axis 517. The first and second openings 514, 516 receive two of the bearing caps 502 of the cross-journal 500. In the illustrated example, the first yoke 504 is integral with the first torque tube fitting 400 and, thus, form a substantially unitary piece or structure. However, in other examples, the first yoke 504 and the first torque tube fitting 400 may be constructed of multiple pieces that are operatively coupled to each other.

As illustrated in FIGS. 4 and 5, a spline gear 406 is coupled to the output shaft 228 of the second GRA 222 (FIG. 3). The spline gear 406 is coupled to the spline coupling 404. In particular, the spline gear 406 has a splined annulus 408 that is received within a bore or opening 410 of the spline coupling 404.

Figure 6:
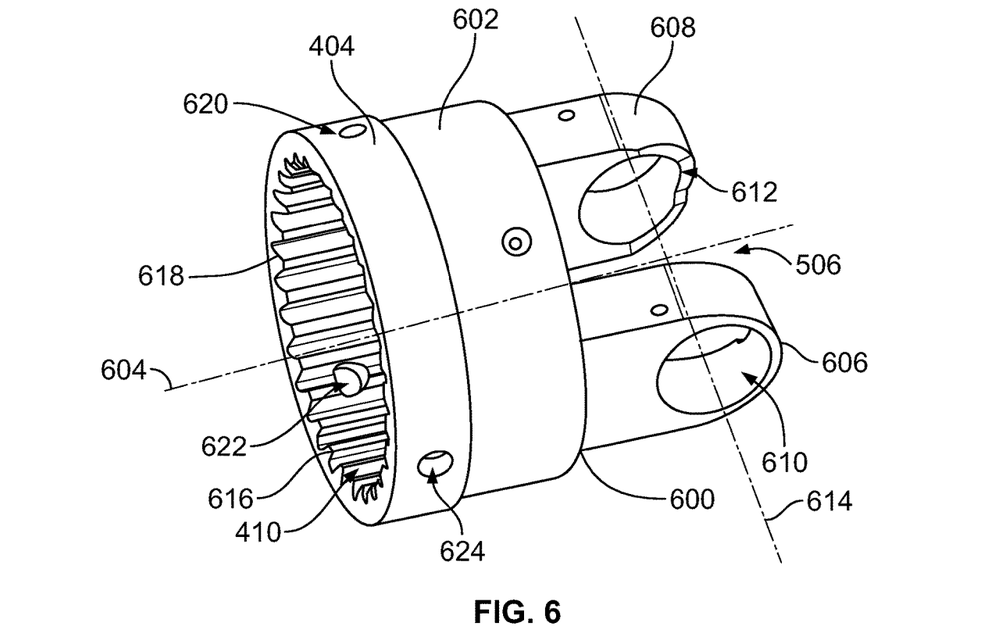
FIG. 6 is an isolated perspective view of the example spline coupling of FIG. 4.
Figure 7:
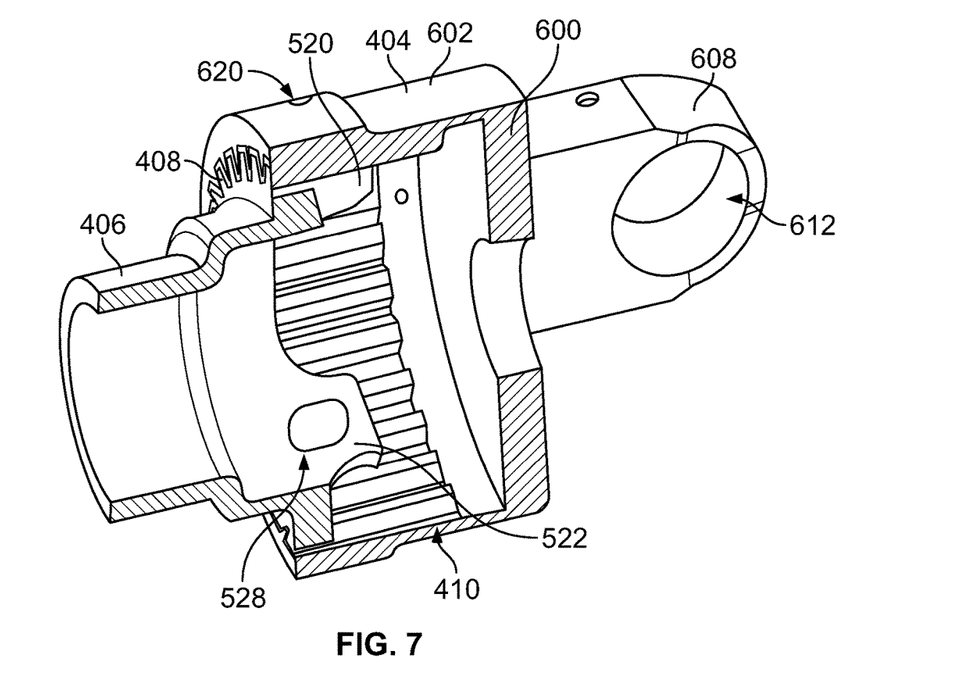
FIG. 7 is a cross-sectional view of the example spline coupling and the example spline gear of FIG. 4.

FIG. 6 shows an isolated perspective view of the spline coupling 404 and FIG. 7 shows a cross-sectional view of the spline gear 406 inserted into the spline coupling 404. As shown in FIGS. 6 and 7, the spline coupling 404 includes a wall or plate 600. An annular wall 602 extends from the plate 600 to define the opening 410, which is aligned with a longitudinal axis 604 of the spline coupling 404. The spline coupling 404 includes a first ear 606 and a second ear 608 extending from the plate 600 that form the second yoke 506 (e.g., in a direction opposite to that of the annular wall 602). The first and second ears 606, 608 have respective first and second openings 610, 612 that are coaxially aligned along an axis 614. In the illustrated example, the axis 614 is perpendicular to the longitudinal axis 604. The first and second openings 610, 612 receive two of the bearing caps 502 (FIG. 5) of the cross-journal 500. As shown in FIG. 6, the opening 410 of the spline coupling 404 includes splines 616 (e.g., ribs, grooves, channels) around an inner surface 618 of the annular wall 602. In the illustrated example, the spline coupling 404 (including the second yoke 506) is a substantially unitary piece or structure. However, in other examples, the spline coupling 404 may be constructed of multiple pieces that are operatively coupled to each other.

In the illustrated example, the spline coupling 404 includes three holes or apertures 620, 622, 624 that extend through the annular wall 602 into the opening 410 (e.g., in a direction perpendicular to the longitudinal axis 604). The holes 620, 622, 624 are to receive threaded fasteners 518 (FIG. 5) to couple the spline gear 406 to the spline coupling 404. In the illustrated example, the holes 620, 622, 624 are equally spaced around the annular wall 602 (e.g., 120° degrees apart from each other). In other examples, the spline coupling 404 may include more or fewer holes and/or the holes may be spaced differently.

As shown in FIGS. 5 and 7, the splined annulus 408 has three protruding nubs or extensions 520, 522, 524 circumferentially spaced around the splined annulus 408. The extensions 520, 522, 524 include respective holes 526, 528, 530, which are to be aligned with the holes 620, 622, 624 of the spline coupling 404. For example, as shown in FIG. 7, the splined annulus 408 is inserted into the opening 410 of the spline coupling 404. The holes 526, 528, 530 of the splined annulus 408 are aligned with the respective holes 620, 622, 624 of the spline coupling 404. The threaded fasteners 518 (FIG. 5) are threaded into the holes 620, 622, 624 and into the holes 526, 528, 530 to couple the spline gear 406 to the spline coupling 404. The threaded fasteners 518 may be bolts, screws or any other suitable fastening mechanisms.

Figure 8:
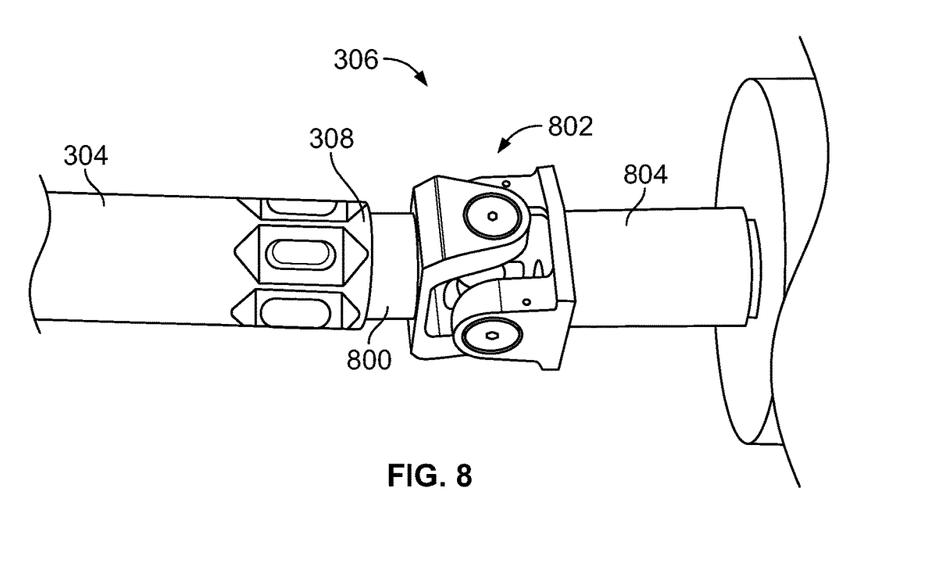
FIG. 8 is an enlarged perspective view of the second example joint of FIG. 4 employing an example sliding splined shaft to receive an example splined shaft.
Figure 9:
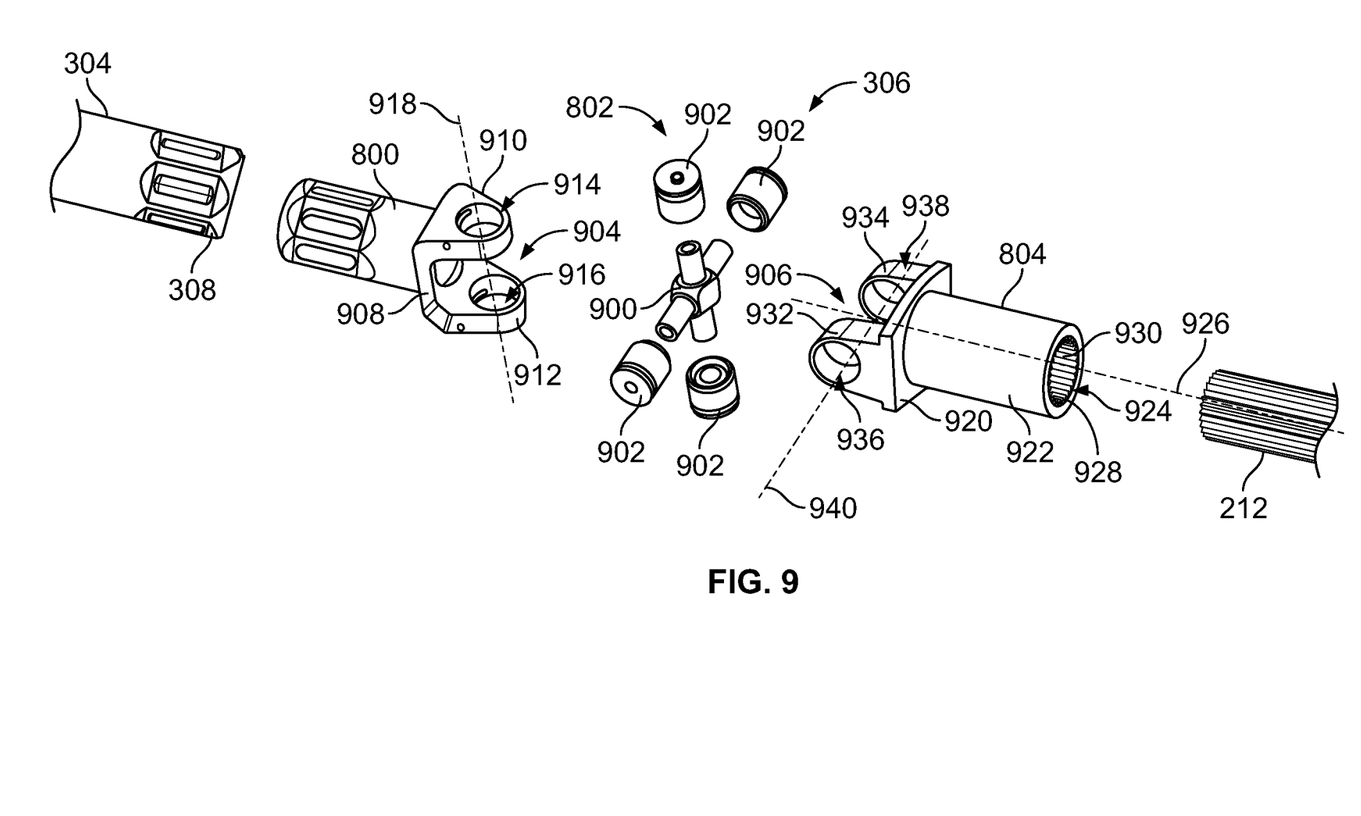
FIG. 9 is an exploded view of the second example joint of FIG. 8.

FIG. 8 shows an enlarged view of the second joint 306 and FIG. 9 shows an exploded view of the second joint 306. As shown in the illustrated example, the second end 308 of the torque tube 304 is coupled to a second torque tube fitting 800 (e.g., an end fitting). The second torque tube fitting 800 is substantially the same as the first torque tube fitting 400 (FIG. 4) and is fixedly coupled to the second end 308 of the torque tube 304 by an EMF process. The second torque tube fitting 800 forms a second U-joint 802 with a sliding splined shaft 804. As shown more clearly in FIG. 9, the second U-joint 802 includes a cross-journal 900 and four bearing caps 902 (which include an array of needle bearings) that are coupled between a third yoke 904 of the second torque tube fitting 800 and a fourth yoke 906 of the sliding splined shaft 804. The second torque tube fitting 800 has a wall or plate 908 and a first ear 910 and a second ear 912 that extend from the plate 908 to form the third yoke 904. The first and second ears 910, 912 have respective first and second openings 914, 916 that are coaxially aligned along an axis 918. The first and second openings 914, 916 receive two of the bearing caps 902 of the cross-journal 900. In the illustrated example, the third yoke 904 is integral with the second torque tube fitting 800 and, thus, form a substantially unitary piece or structure. However, in other examples, the third yoke 904 and the second torque tube fitting 800 may be constructed of multiple pieces that are operatively coupled to each other.

Figure 10:
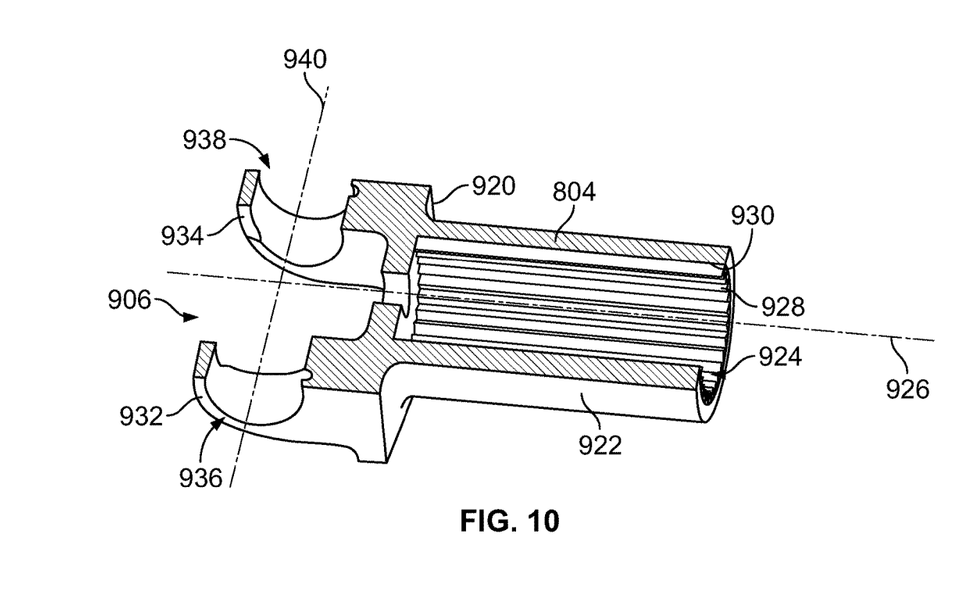
FIG. 10 is a cross-sectional view of the example sliding splined shaft of FIG. 8.

As illustrated in FIGS. 9 and 10, the sliding splined shaft 804 includes a wall or plate 920 and an annular wall or sleeve 922 that extends from the plate 920. The sleeve 922 defines an opening 924 that is aligned with a longitudinal axis 926 of the sliding splined shaft 804. The opening 924 includes splines 928 (e.g., ribs, grooves, channels) on an inner surface 930 of the sleeve 922. The opening 924 is to receive the input shaft 212 of the first GRA 208, which includes matching splines. In the illustrated example, the fourth yoke 906 is formed by a first ear 932 and a second ear 934 that extend from the plate 920 (e.g., in a direction opposite of the sleeve 922). The first and second ears 932, 934 have respective first and second openings 936, 938 that are coaxially aligned along an axis 940. The first and second openings 936, 938 receive two of the bearing caps 902 of the cross-journal 900. In the illustrated example, the sliding splined shaft 804 (including the fourth yoke 906) is a substantially unitary piece or structure. However, in other examples, the sliding splined shaft 804 may be constructed of multiple pieces that are operatively coupled to each other.

In the illustrated example, the sliding splined shaft 804 is not fixedly coupled to the input shaft 212 of the first GRA 208. Instead, the sliding splined shaft 804 can slide along the input shaft 212, thereby enabling the torque tube assembly 200 (FIG. 2) to move axially (e.g., longitudinally) as the first wing 104 (FIG. 2) flexes or bends. Additionally, the U-joints 300, 306 enable the torque tube assembly to move angularly with respect the output shaft 228 of the second GRA 222 and the input shaft 212 of the first GRA 208. Therefore, the torque tube assembly 200 can be displaced angularly and/or axially and, thus, less strain or adverse forces are imparted on the torque tube assembly 200 than experienced in known systems.

Figure 11:
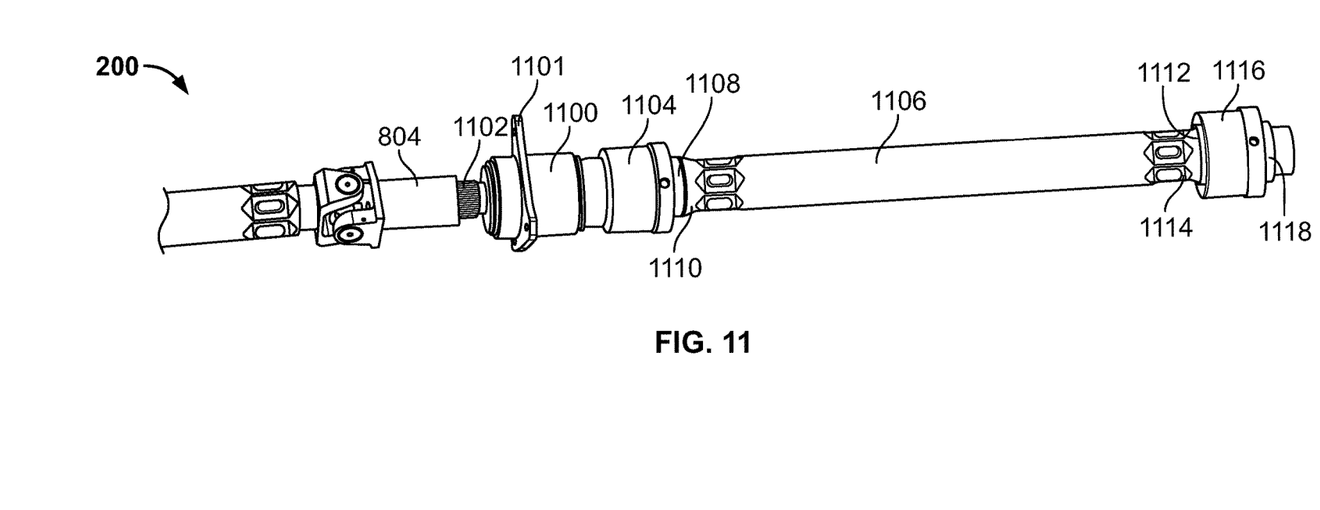
FIG. 11 is a perspective view of an example torque tube extension that may be implemented between a tube support and driven member.

In some examples, one or more torque tube supports may be located between two actuators or driving mechanisms (e.g., when a distance between two actuators is relatively long). Therefore, in some examples, the torque tube assembly 200 may be split or divided into additional torque tube assemblies. For example, instead of being coupled to a shaft (e.g., of an upstream or downstream actuator), the sliding splined shaft 804 may be coupled to a splined shaft at a torque tube support (e.g., a rib or support in the wing). FIG. 11 shows an example of the sliding splined shaft 804 of the torque tube assembly 200 slidably coupled to a torque tube support 1100. The torque tube support 1100 may be mounted to a rib or support beam in the first wing 104 (FIG. 1). For example, the torque tube support 1100 includes a flange 1101 that may be fastened (e.g., via one or more bolts or screws) to a rib or support beam. In the illustrated example, the torque tube support 1100 has a splined shaft 1102 that is inserted into the opening 924 (FIGS. 9 and 10) of the sliding splined shaft 804. The sliding splined shaft 804 is slidable along the splined shaft 1102. The splined shaft 1102 transfers rotational energy through a bearing in the torque tube support 1100 to a first coupling 1104. In the illustrated example, the first coupling 1104 is movable into and out of the torque tube support 1100 (e.g., to enable the downstream torque tube to move axially). A second torque tube 1106 is used to transfer rotational energy from the first coupling 1104 to a driven shaft, such as a pinion shaft, an input/output shaft of a GRA or a tube support, as desired. A second spline gear 1108 is fixedly coupled to a first end 1110 of the second torque tube 1106. The second spline gear 1108 may be substantially similar to the spline gear 406 as illustrated in FIG. 4. The second spline gear 1108 is inserted into an opening of the first coupling 1104 and fixedly coupled to the first coupling 1104. The opening of the first coupling 1104 may be substantially similar to the opening 410 of the spline coupling 404 (FIG. 4). The second spline gear 1108 and the first coupling 1104 may be similarly coupled via one or more threaded fasteners. In the illustrated example, the second spline gear 1108 is fixedly coupled to the first end 1110 of the second torque tube 1106 by an EMF process. However, in other examples, other fastening techniques may be implemented to couple the second spline gear 1108 to the first end 1110 of the second torque tube 1106.

In the illustrated example, a third spline gear 1112 is fixedly coupled to a second end 1114 of the second torque tube 1106. In some examples, the third spline gear 1112 is likewise fixedly coupled to the second end 1114 of the second torque tube 1106 by an EMF process. In the illustrated example, the third spline gear 1112 is slidably coupled to a second coupling 1116. The second coupling 1116 is coupled to a fourth spline gear 1118. The fourth spline gear 1118 may be coupled to a pinion shaft, an input/output shaft of a GRA or another tube support. In the illustrated example, the fourth spline gear 1118 is fixedly coupled to the second coupling 1116 via one or more threaded fasteners, similar to the first coupling 1104 and the second spline gear 1108. In the illustrated example, the first coupling 1104 is movable axially relative to the torque tube support 1100 and the third spline gear 1112 is slidable within the second coupling 1116, which enables the second torque tube 1106 to move axially between the torque tube support 1100 and a downstream member, such a pinion shaft, a GRA or a splined shaft of another tube support.

Figure 12:
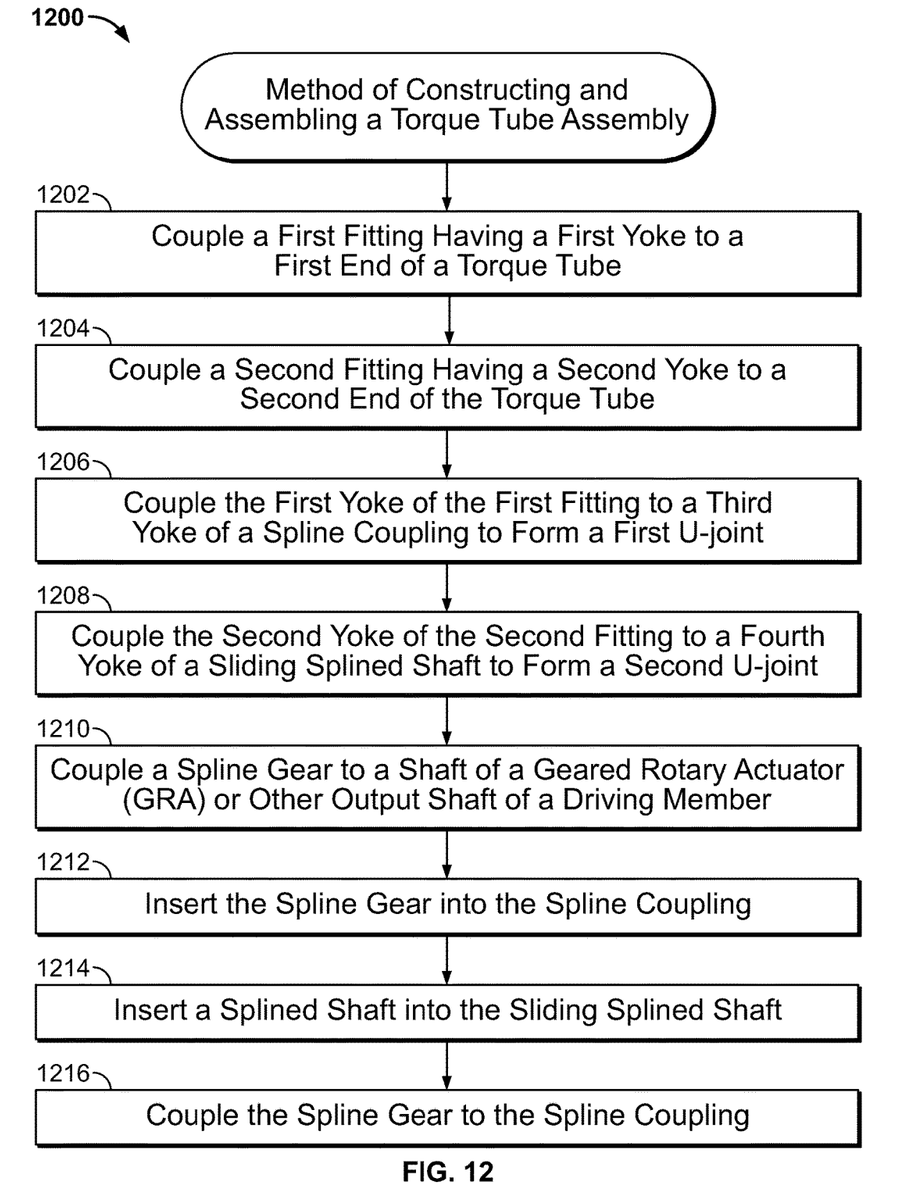
FIG. 12 is an example method for constructing and/or assembling an example torque tube assembly.

FIG. 12 is a flowchart representative of an example method 1200 that may be implemented to construct and/or assemble an example torque tube assembly, such as the example torque tube assembly 200 of FIG. 2. The example method 1200 includes coupling a first fitting having a first yoke to a first end of a torque tube (block 1202). In some examples, the first fitting is coupled to the first end of the torque tube via EMF. For example, the first torque tube fitting 400, which includes the first yoke 504, is coupled to the first end 302 of the torque tube 304 via EMF. The example method 1200 includes coupling a second fitting having a second yoke to a second end of the torque tube (block 1204). In some examples, the second fitting is coupled to the second end of the torque tube via EMF. For example, the second torque tube fitting 800, which includes the third yoke 904, is coupled to the second end 308 of the torque tube 304 via EMF. However, in other examples, the first and second torque tube fittings 400, 800 may be coupled to the torque tube 304 via other coupling techniques (e.g., welding).

The example method 1200 includes coupling the first yoke of the first fitting to a third yoke of a spline coupling to form a first U-joint (block 1206). For example, as illustrated in FIG. 5, the first yoke 504 of the first torque tube fitting 400 is coupled (e.g., via the cross-journal 500 and the bearing caps 502) to the second yoke 506 of the spline coupling 404 to form the first U-joint 402. The example method 1200 includes coupling the second yoke of the second fitting to a fourth yoke of a sliding splined shaft to form a second U-joint (block 1208). For example, as illustrated in FIG. 9, the third yoke 904 of the second torque tube fitting 800 is coupled (e.g., via the cross-journal 900 and the bearing caps 902) to the fourth yoke 906 of the sliding splined shaft 804 to form the second U-joint 802.

The example method 1200 includes of coupling a spline gear to a shaft of a geared rotary actuator (GRA) or other output shaft of a driving member (block 1210). For example, as illustrated in FIG. 4, the spline gear 406 is coupled to the output shaft 228 of the second GRA 222 (FIG. 2). The example method 1200 includes inserting the spline gear into the spline coupling (block 1212). For example, the spline coupling 404 may be moved toward the spline gear 406 such that the spline gear 406 is inserted into the opening 410 of the spline coupling 404. The example method 1200 includes inserting a splined shaft (e.g., of a pinion gear, a GRA or a tube support) into the sliding splined shaft (block 1214). For example, the sliding splined shaft 804 may be moved toward the input shaft 212 of the first GRA 208 such that the input shaft 212 is received within the opening 924 of the sliding splined shaft 804.

The example method 1200 includes coupling (e.g., fixedly coupling) the spline gear to the spline coupling (block 1216). For example, as illustrated in FIGS. 5-7, the spline coupling 404 includes three holes 620, 622, 624 that are aligned with the three holes 526, 528, 530 of the spline gear 406. The threaded fasteners 518 may be threaded into the holes 620, 622, 624, 526, 528, 530 to fixedly couple the spline gear 406 to the spline coupling 404.

Although the spline coupling is described as being coupled to the output of a driving member and the sliding splined shaft is described as being coupled to a driven member, it is understood that the torque tube assembly may be used in reverse. In other words, the sliding splined shaft may be coupled to a splined shaft of a driving member, which thereby drives the spline coupling. Additionally, although the example torque tube assembly is disclosed in relation to high lift devices of an aircraft, the example torque tube assembly may be used in any industry or application where rotational energy is transferred from one drive shaft to another.

From the foregoing, it will be appreciated that the above disclosed torque tube assemblies and methods of making the same provide a more flexible attachment between an upstream drive stream and a downstream drive shaft. In particular, the torque tube assemblies can move axially and angularly to adapt to any flexing and/or bending that may occur in a wing of an aircraft or other structure to which the torque tube assemblies are connected. As a result, less force or tension is concentrated along the torque tube assembly, thereby improving the structural integrity the torque tube assembly.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft apparatus comprising:
   a first drive shaft of a first rotary actuator of a first high lift device in a wing of an aircraft;
   a second drive shaft of a second rotary actuator of a second high lift device in the wing of the aircraft;
   a spline coupling having a first yoke, the spline coupling fixedly coupled to the first drive shaft of the first rotary actuator;
   a sliding splined shaft having a second yoke, the sliding splined shaft slidably coupled to the second drive shaft of the second rotary actuator such that sliding splined shaft is movable in an axial direction along the second drive shaft; and
   a torque tube having a first end and a second end opposite the first end, a first fitting with a third yoke coupled to the first end of the torque tube, and a second fitting with a fourth yoke coupled to the second end of the torque tube, the third yoke of the first fitting coupled to the first yoke of the spline coupling to form a first U-joint, and the fourth yoke of the second fitting coupled to the second yoke of the sliding splined shaft to form a second U-joint.

2. The apparatus of claim 1, wherein the first fitting is coupled to the first end of the torque tube via an electromagnetic forming (EMF) process and the second fitting is coupled to the second end of the torque tube via the EMF process.

3. The apparatus of claim 1, wherein the spline coupling is to receive a spline gear coupled to the first drive shaft.

4. The apparatus of claim 3, wherein the spline coupling includes an aperture to receive a threaded fastener to fixedly couple the spline coupling to the spline gear.

5. The apparatus of claim 1, wherein the spline coupling includes a plate and an annular wall extending from the plate in a first direction, the first yoke extending from the plate in second direction opposite the first direction.

6. The apparatus of claim 5, wherein the annular wall and the plate form an opening to receive a spline gear, an inner surface of the annular wall having splines.

7. The apparatus of claim 5, wherein the spline coupling is a substantially unitary structure.

8. The apparatus of claim 1, wherein the sliding splined shaft includes a sleeve defining an opening to receive the second drive shaft, the opening including splines.

* * * * *